(12) United States Patent
Ji et al.

(10) Patent No.: US 9,141,507 B2
(45) Date of Patent: Sep. 22, 2015

(54) VISUALIZATION OF STATES OF A PROCESS

(75) Inventors: Xinhua Ji, Shanghai (CN); Alexander Dadiomov, Redmond, WA (US); Hazim Shafi, Redmond, WA (US); Eric Ledoux, Bellevue, WA (US); William T. Colburn, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 881 days.

(21) Appl. No.: 12/646,155

(22) Filed: Dec. 23, 2009

(65) Prior Publication Data
US 2011/0154245 A1 Jun. 23, 2011

(51) Int. Cl.
G06F 3/00 (2006.01)
G06F 11/32 (2006.01)
G06F 3/01 (2006.01)
G06F 11/36 (2006.01)

(52) U.S. Cl.
CPC .......... *G06F 11/323* (2013.01); *G06F 11/3664* (2013.01)

(58) Field of Classification Search
USPC ........... 715/772, 856, 808; 345/440, 140, 130
See application file for complete search history.

(56) References Cited

U.S. PATENT DOCUMENTS

| | | | |
|---|---|---|---|
| 5,781,188 A * | 7/1998 | Amiot et al. | 715/723 |
| 6,052,515 A | 4/2000 | Bruckhaus | |
| 6,097,399 A * | 8/2000 | Bhatt et al. | 345/440 |
| 6,167,490 A * | 12/2000 | Levy et al. | 711/148 |
| 6,219,050 B1 * | 4/2001 | Schaffer | 715/853 |
| 6,611,728 B1 * | 8/2003 | Morioka et al. | 700/109 |
| 6,876,948 B1 * | 4/2005 | Smith | 702/181 |
| 6,883,030 B1 | 4/2005 | Leins et al. | |
| 6,925,423 B2 * | 8/2005 | Fukube et al. | 702/187 |
| 7,924,283 B1 * | 4/2011 | Hao et al. | 345/440 |
| 8,583,314 B2 * | 11/2013 | de Oliveira et al. | 701/29.5 |
| 2002/0070953 A1 * | 6/2002 | Barg et al. | 345/700 |
| 2003/0079162 A1 * | 4/2003 | Sutton | 714/46 |
| 2003/0208335 A1 * | 11/2003 | Unuma et al. | 702/141 |
| 2004/0095398 A1 * | 5/2004 | Muratori et al. | 345/855 |
| 2005/0177598 A1 * | 8/2005 | Hao et al. | 707/104.1 |

(Continued)

OTHER PUBLICATIONS

Madni, et al., "An Adaptive Wide-area Design Process Manager for Collaborative Multichip Module Design", Retreived at <<http://ieeexplore.ieee.org/stamp/stamp.jsp?arnumber=00569347>>, Proceedings of the 1997 Conference on IEEE Multi-Chip Module Conference, Feb. 4-5, 1997, pp. 63-72.

(Continued)

*Primary Examiner* — Nicholas Augustine
*Assistant Examiner* — Toan Vu
(74) *Attorney, Agent, or Firm* — Kevin Sullivan; Kate Drakos; Micky Minhas

(57) ABSTRACT

A method of providing a visualization of states of a process includes identifying a set of potential states that can occur during the process and a corresponding set of colors, with each color in the set of colors corresponding to one of the potential states. A fixed ordering is established for the set of colors. A timeline graph including a plurality of colored vertical bars is displayed. Each colored vertical bar corresponds to a time interval of the process and includes at least one color selected from the set of colors based on at least one state occurring during the time interval corresponding to the vertical bar. The plurality of colored vertical bars includes a set of multiple-color vertical bars that each include a plurality of colors appearing in a vertical order based on the fixed ordering.

17 Claims, 5 Drawing Sheets

(56) References Cited

U.S. PATENT DOCUMENTS

| | | | |
|---|---|---|---|
| 2005/0217794 A1* | 10/2005 | Kagoshima et al. | 156/345.24 |
| 2006/0027662 A1 | 2/2006 | Baradi | |
| 2006/0064325 A1* | 3/2006 | Matsumoto et al. | 705/3 |
| 2006/0090141 A1* | 4/2006 | Loui et al. | 715/764 |
| 2006/0153174 A1* | 7/2006 | Towns-von Stauber et al. | 370/356 |
| 2007/0038963 A1* | 2/2007 | Moore | 715/859 |
| 2007/0245238 A1* | 10/2007 | Fugitt et al. | 715/700 |
| 2007/0250809 A1* | 10/2007 | Kennedy et al. | 717/109 |
| 2008/0037432 A1* | 2/2008 | Cohen et al. | 370/241 |
| 2008/0079747 A1* | 4/2008 | Saida et al. | 345/589 |
| 2008/0133523 A1* | 6/2008 | Norton et al. | 707/6 |
| 2008/0227088 A1* | 9/2008 | Albino et al. | 435/6 |
| 2009/0035397 A1* | 2/2009 | Kothari | 424/729 |
| 2009/0098547 A1* | 4/2009 | Ghosh | 435/6 |
| 2009/0199118 A1* | 8/2009 | Sabato et al. | 715/765 |
| 2009/0217181 A1* | 8/2009 | Kumar | 715/762 |
| 2009/0248865 A1* | 10/2009 | Kodama et al. | 709/224 |
| 2009/0304297 A1* | 12/2009 | Adabala et al. | 382/248 |
| 2010/0049471 A1* | 2/2010 | Gage et al. | 702/173 |
| 2010/0191564 A1* | 7/2010 | Lee et al. | 705/7 |
| 2010/0262901 A1* | 10/2010 | DiSalvo | 715/227 |
| 2010/0318408 A1* | 12/2010 | Sankaran et al. | 705/11 |
| 2011/0066973 A1* | 3/2011 | Plom et al. | 715/808 |
| 2011/0126136 A1* | 5/2011 | Abella et al. | 715/764 |
| 2011/0144948 A1* | 6/2011 | Nishino et al. | 702/183 |
| 2011/0197157 A1* | 8/2011 | Hoffman et al. | 715/772 |
| 2011/0282230 A9* | 11/2011 | Liley | 600/544 |
| 2012/0271754 A1* | 10/2012 | Burns et al. | 705/37 |
| 2013/0343221 A1* | 12/2013 | Woodings | 370/252 |

OTHER PUBLICATIONS

"Watchdog Process", Retreived at <<http://www.cisco.com/en/US/docs/net_mgmtpacket_telephony_center_virtual_switch/3.0/user/guide/watchdog.html,>>2007, pp. 1-3.

"Graphic Symbols for Process Displays", Retreived at <<http://www.isa.org/Content/Microsites165/SP18,_Instrument_Signals_and_Alarms/Home163/ISA_Standards_for_Committee_Use/S_55.pdf>>, 1985, pp. 48.

Gabriel- Petit, Pabini, "Applying Color Theory to Digital Displays", Retreived at <<http://www.uxmatters.com/mt/archives/2007/01/applying-color-theory-to-digital-displays.php>>, Jan. 20, 2007, pp. 1-26.

\* cited by examiner

VISUALIZATION OF STATES OF A PROCESS

BACKGROUND

One method of representing the states that occur in a process is with a timeline in a graphical user interface with every time period or time interval of the process represented by a pixel of a certain color, and with the different states represented by different colors (e.g., green for execution, red for waiting, blue for yielding, etc.). Because computer displays have limited resolution and because the process being represented may have a larger set of state transitions than pixels, the time period corresponding to any given pixel may contain more than one state, and representing the time period with a single color results in a loss of information. The loss of information can be detrimental to the utility of the visualizations in identifying interesting aspects of the behavior of the process.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

One embodiment provides a data visualization application for generating a visualization of the states of a process. In one embodiment, for each time interval of the process that includes more than one state, the two most prominent states for each of these intervals are identified, and the two colors corresponding to the two most prominent states are displayed in a fixed order in a vertical bar or a vertical line segment corresponding to the interval.

One embodiment provides a method of providing a visualization of states of a process. The method includes identifying a set of potential states that can occur during the process and a corresponding set of colors, with each color in the set of colors corresponding to one of the potential states. A fixed ordering is established for the set of colors. A timeline graph including a plurality of colored vertical bars is displayed. Each colored vertical bar corresponds to a time interval of the process and includes at least one color selected from the set of colors based on at least one state occurring during the time interval corresponding to the vertical bar. The plurality of colored vertical bars includes a set of multiple-color vertical bars that each include a plurality of colors appearing in a vertical order based on the fixed ordering.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides a data visualization application for generating a visualization of the states of a process, but the technologies and techniques described herein also serve other purposes in addition to these. In one embodiment, the data visualization application generates a compressed representation of a complex state data series with less loss of information than other approaches.

When a timeline is used to represent some behavior by color-coding different states, presentation frameworks typically assume some minimum granularity for the presentation (e.g., one pixel corresponds to some time period). The pixel's color shows the state of the process at the time period corresponding to the pixel. However, there may be time periods with multiple states, and the timeline will lose information if only a single state is represented per time period. One way to present more information in a timeline is to use vertical lines instead of single pixels. Each vertical line can be used as a histogram, showing the distribution of states for the time interval corresponding to the vertical line. However, when there are many states per time interval, the resultant view is typically too noisy to convey useful, comprehensible information to the user.

In one embodiment, for each time interval of the process that includes more than two states, the two most prominent states for each of these intervals are identified, and the two colors corresponding to the two most prominent states are displayed in the vertical bar or vertical line segment corresponding to the interval. The colors for the remaining states (i.e., the states that are not one of the two most prominent states) in each time interval are not displayed.

Even if the number of colors per line segment is limited to a fixed number of prominent states, the resultant view can still be noisy and difficult to comprehend because colors can change order and create a mosaic pattern if they are displayed based on the prominence or duration of states. In one embodiment, the colors are displayed in a fixed order, which improves the comprehensibility of the displayed information. One embodiment generates a timeline with vertical bars that are each limited to two colors in a fixed order, which provides a visualization that is more comprehensible and less lossy than other approaches.

Figure 1:
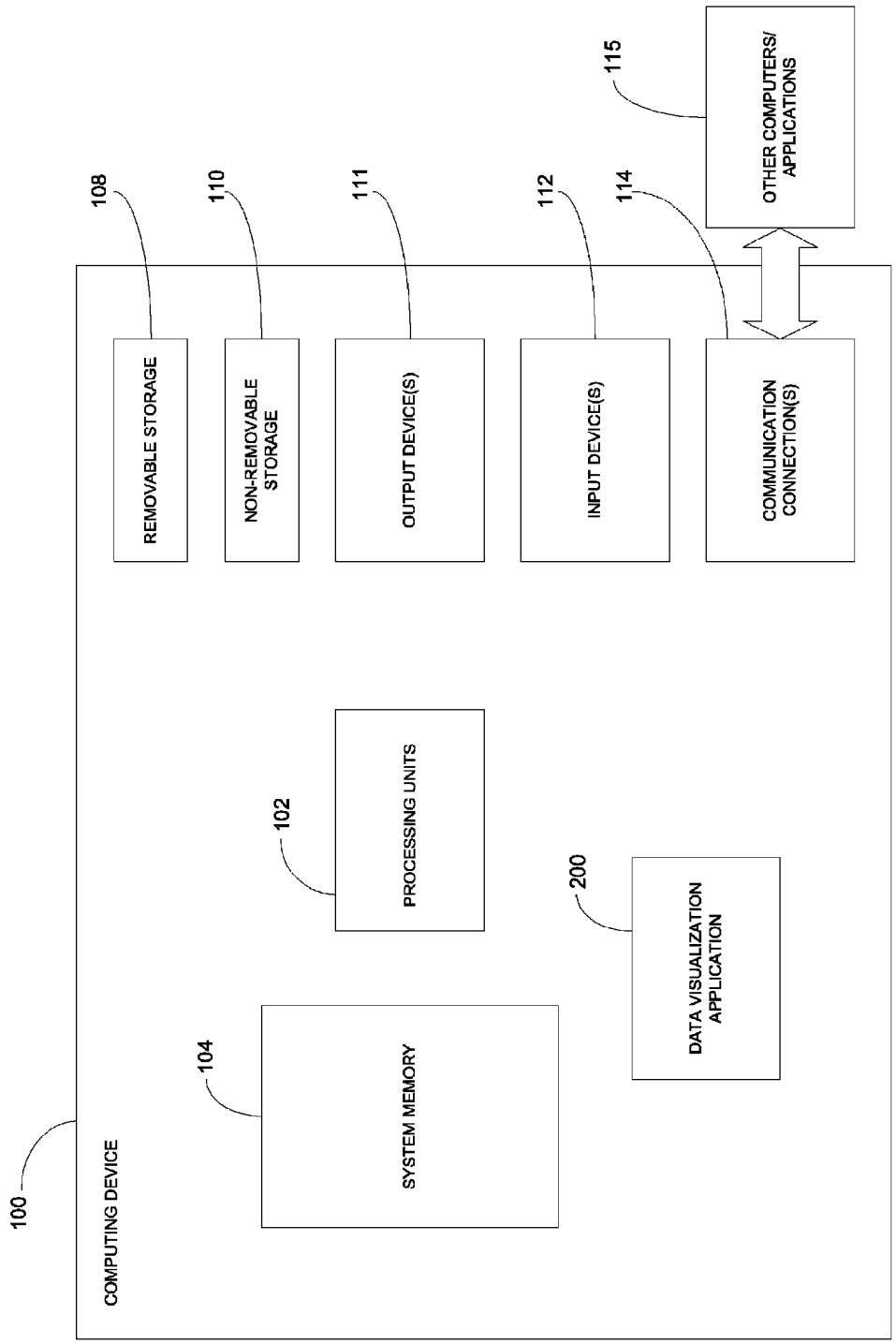
FIG. 1 is a diagram illustrating a computing device suitable for executing a data visualization application according to one embodiment.

FIG. 1 is a diagram illustrating a computing device 100 suitable for executing a data visualization application according to one embodiment. In the illustrated embodiment, the computing system or computing device 100 includes a plurality of processing units 102 and system memory 104. Depending on the exact configuration and type of computing device, memory 104 may be volatile (such as RAM), non-volatile (such as ROM, flash memory, etc.), or some combination of the two.

Computing device 100 may also have additional features/functionality. For example, computing device 100 may also include additional storage (removable and/or non-removable) including magnetic or optical disks or tape. Such additional storage is illustrated in FIG. 1 by removable storage 108 and non-removable storage 110. Computer storage media includes volatile and nonvolatile, removable and non-removable media implemented in any suitable method or technology for non-transitory storage of information such as computer readable instructions, data structures, program modules or other data. Memory 104, removable storage 108 and non-removable storage 110 are all examples of computer storage media (e.g., computer-readable storage media storing computer-executable instructions for performing a method). Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices. Any such non-transitory computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one embodiment, computing device 100 includes a data visualization application 200. Data visualization application 200 is described in further detail below with reference to FIG. 2.

Figure 2:
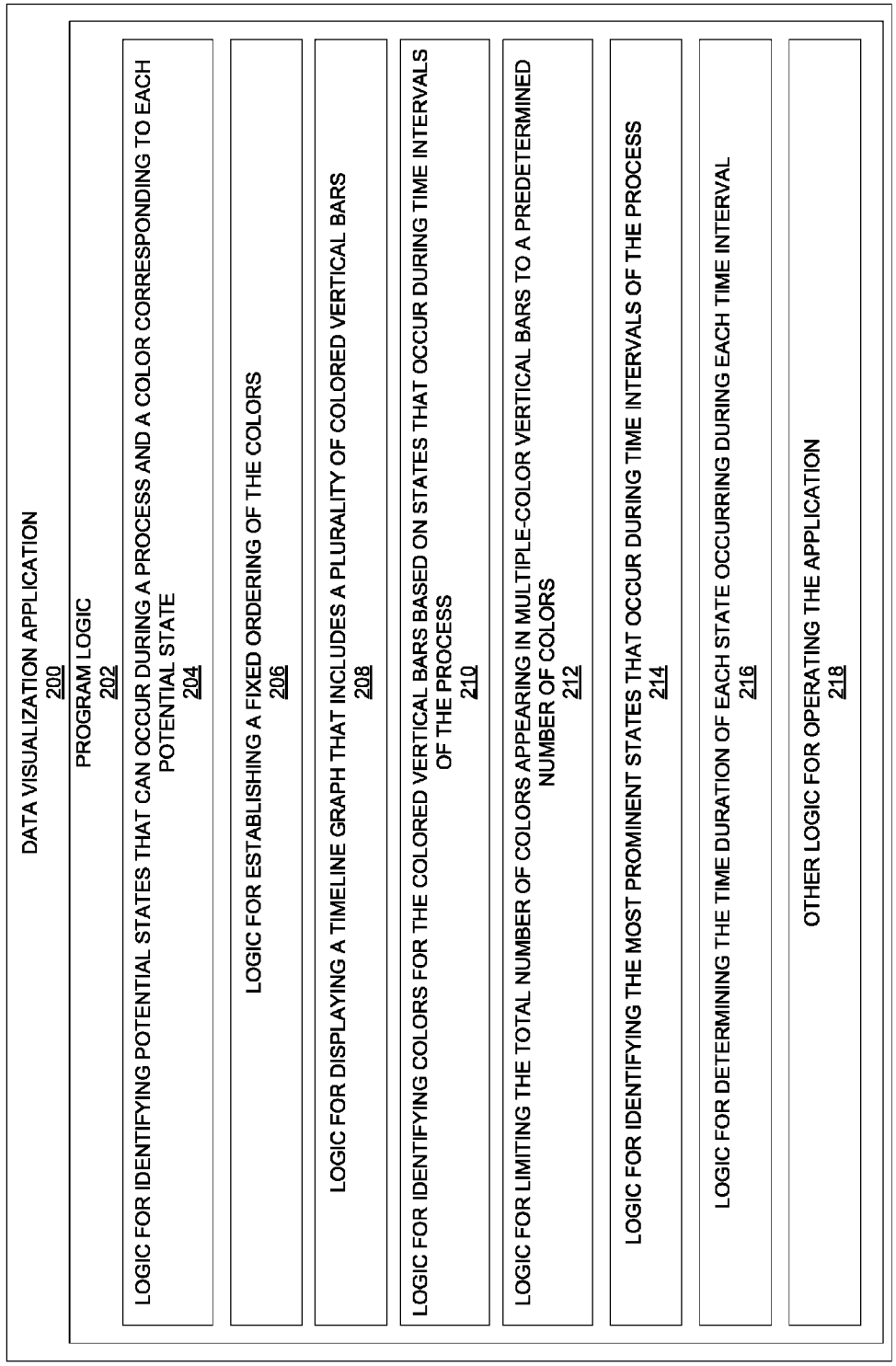
FIG. 2 is a diagrammatic view of a data visualization application for operation on the computing device illustrated in FIG. 1 according to one embodiment.

FIG. 2 is a diagrammatic view of a data visualization application 200 for operation on the computing device 100 illustrated in FIG. 1 according to one embodiment. Application 200 is one of the application programs that reside on computing device 100. However, application 200 can alternatively or additionally be embodied as computer-executable instructions on one or more computers and/or in different variations than illustrated in FIG. 1. Alternatively or additionally, one or more parts of application 200 can be part of system memory 104, on other computers and/or applications 115, or other such suitable variations as would occur to one in the computer software art.

Data visualization application 200 includes program logic 202, which is responsible for carrying out some or all of the techniques described herein. Program logic 202 includes logic 204 for identifying potential states that can occur during a process and a color corresponding to each potential state; logic 206 for establishing a fixed ordering of the colors; logic 208 for displaying a timeline graph that includes a plurality of colored vertical bars; logic 210 for identifying colors for the colored vertical bars based on states that occur during time intervals of the process; logic 212 for limiting the total number of colors appearing in multiple-color vertical bars to a predetermined number of colors (e.g., two); logic 214 for identifying the most prominent states that occur during time intervals of the process; logic 216 for determining the time duration of each state occurring during each time interval; and other logic 218 for operating the application.

Figure 3:
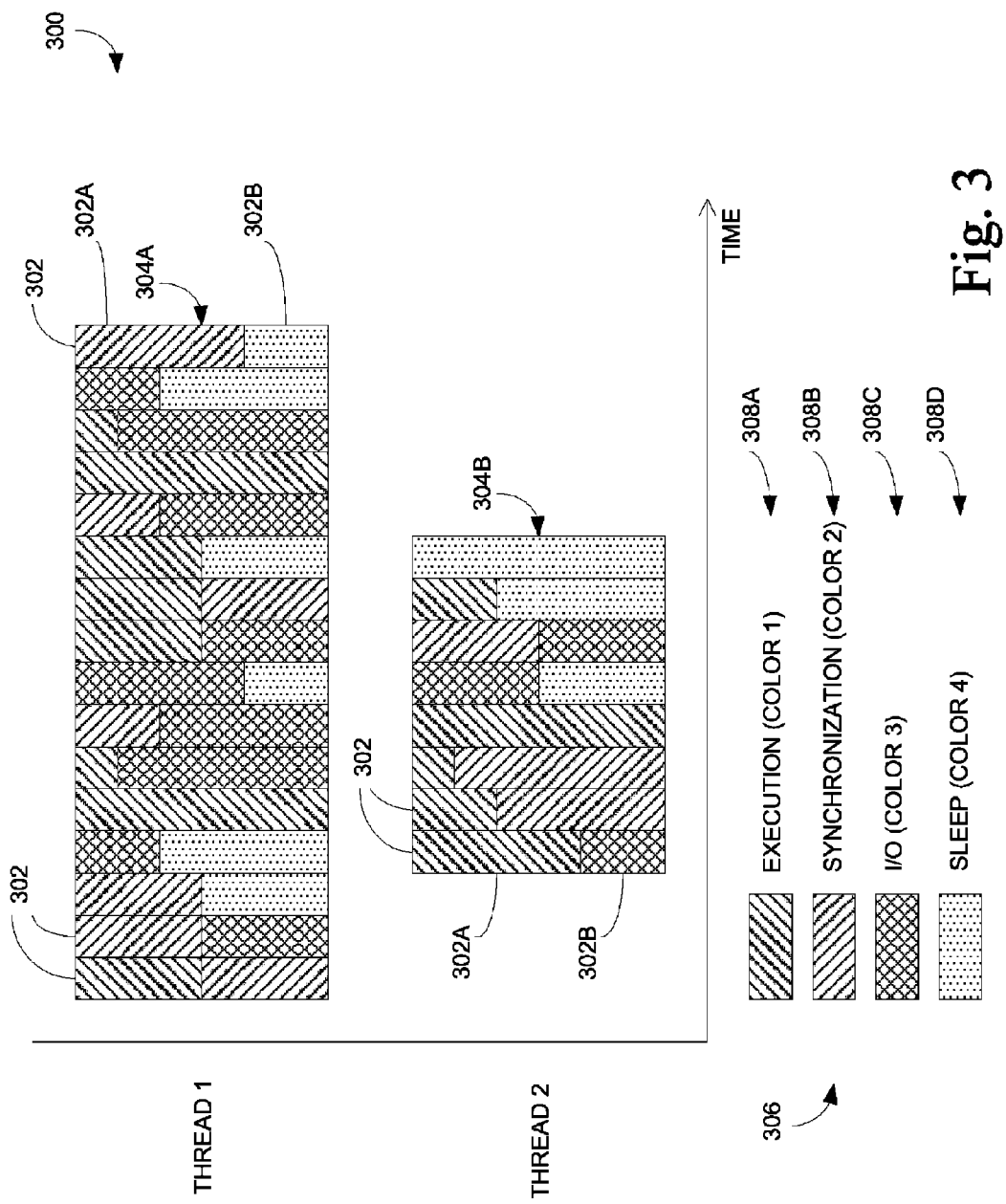
FIG. 3 is a diagram illustrating a timeline graph for providing a visualization of states of a process according to one embodiment.

FIG. 3 is a diagram illustrating a timeline graph 300 for providing a visualization of states of a process according to one embodiment. In one embodiment, application 200 is configured to generate timeline graphs such as graph 300 shown in FIG. 3. In the illustrated embodiment, graph 300 visually represents the states of threads in a multi-threaded system, but it will be understood that the techniques described herein are applicable to virtually any type of process. The horizontal axis in graph 300 represents time. In the illustrated embodiment, graph 300 shows the states of two threads over time as a computer program is being executed by the threads (i.e., graph 300 shows a historical representation of what happens with the threads during the execution of the program). A first thread (Thread 1) is represented by graph 304A, and a second thread (Thread 2) is represented by graph 304B. Graphs 304A and 304B are collectively referred to herein as graphs 304. Graphs 304 each include a plurality of colored vertical bars 302 positioned in a side-by-side manner. In the embodiment illustrated in FIG. 3, the colored vertical bars 302 each have an equal height and width. In one embodiment, the colored vertical bars 302 are each one pixel wide vertical lines, which are positioned directly adjacent to each other with no gap therebetween.

Each vertical bar 302 corresponds to a time interval of the process and represents one or more states of the threads that occur during that time interval. In one embodiment, the time intervals represented by the vertical bars 302 are equal or uniform time intervals. Since each vertical bar 302 represents a time interval, as opposed to an instantaneous point in time, each thread may experience more than one state during that time interval. In the illustrated embodiment, some of the vertical bars 302 represent one state (i.e., single-color vertical bars) and other vertical bars 302 represent more than one state (i.e., multiple-color vertical bars or two-color vertical bars). The different states are represented in the vertical bars 302 by different colors. The potential states of the threads along with their corresponding colors are given in legend 306. In the illustrated embodiment, the potential states include an execution state 308A that is represented by a first color (with the first color being represented in FIG. 3 by a first arrangement of diagonal shading); a synchronization state 308B that is represented by a second color (with the second color being represented in FIG. 3 by a second arrangement of diagonal shading); an input/output (I/O) state 308C that is represented by a third color (with the third color being represented in FIG. 3 by cross-hatching); and a sleep state 308D that is represented by a fourth color (with the fourth color being represented in FIG. 3 by stipple shading). The potential states 308A-308D are collectively referred to herein as potential states 308.

In one embodiment, a fixed or static ordering is established for the set of colors representing the potential states 308, and the colors in the vertical bars 302 are displayed in accordance with this fixed ordering (e.g., the colors in each vertical bar 302 are displayed in a vertical order based on the fixed ordering). In the embodiment illustrated in FIG. 3, the colors for the states 308 are shown in their fixed order in legend 306. Thus, for example, for any given multiple-color vertical bar 302 that includes the color for state 308A, the color for state 308A will appear above the colors for states 308B-308D in that vertical bar 302. Similarly, the color for state 308B will appear above the colors for states 308C and 308D, and the color for state 308C will appear above the color for state 308D.

In the embodiment shown in FIG. 3, the total number of colors appearing in each multiple-color vertical bar 302 is limited to two colors. In this embodiment, for any given multiple-color vertical bar 302, even if more than two states 308 occur during the time interval corresponding to this vertical bar 302, two states are selected from the set of states that occurred, and the colors corresponding to the two selected states are displayed. In one embodiment, the two selected states are the two most prominent states that occurred during the time interval. The two most prominent states are identified in one embodiment based on the time durations of the states occurring during the time interval (i.e., the states with the two longest time durations are selected as the two most prominent states). In one embodiment, the total time duration of each state occurring during each time interval of the process is determined, and the vertical height for each color appearing in the multiple-color vertical bars 302 is determined based on these time durations. Thus, for example, if one of the threads goes through state 308A and state 308B during a given time, but was in state 308A for a longer period of time than state 308B, the color for state 308A will have a larger vertical size in the corresponding vertical bar 302 than the color for state 308B.

Figure 4:
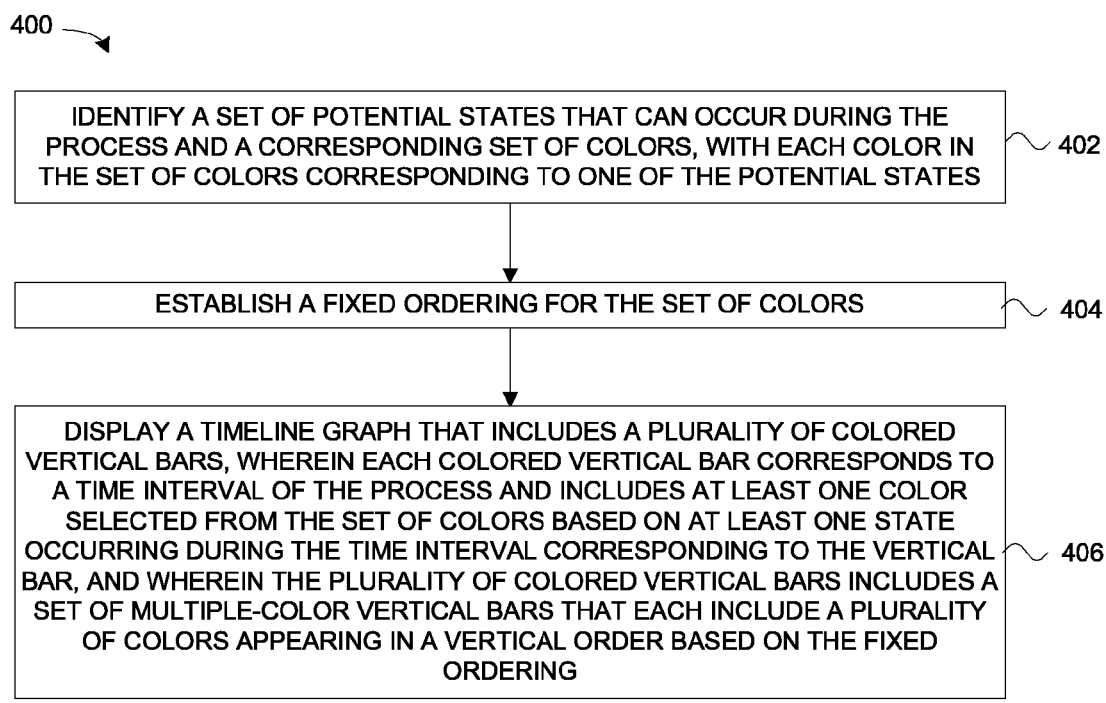
FIG. 4 is a flow diagram illustrating a method of providing a visualization of states of a process according to one embodiment.
Figure 5:
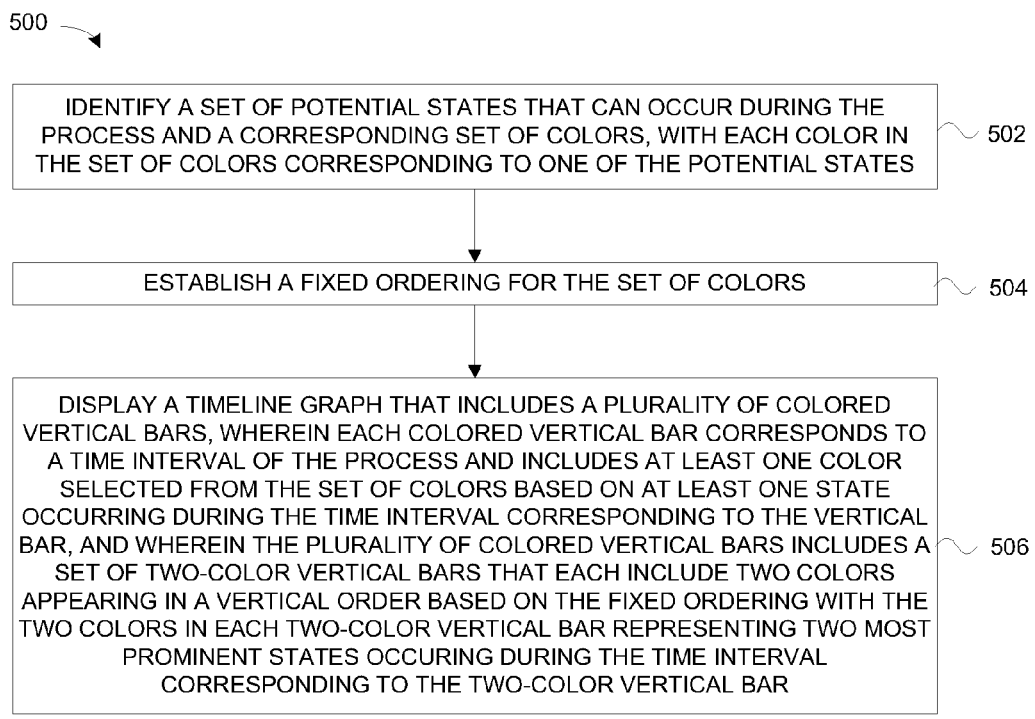
FIG. 5 is a flow diagram illustrating a method of providing a visualization of states of a process according to another embodiment.

Turning now to FIGS. 4 and 5, techniques for implementing one or more embodiments of data visualization application 200 are described in further detail. In some implementations, the techniques illustrated in FIGS. 4 and 5 are at least partially implemented in the operating logic of computing device 100.

FIG. 4 is a flow diagram illustrating a method 400 of providing a visualization of states of a process according to one embodiment. At 402 in method 400, a set of potential states 308 that can occur during the process and a corresponding set of colors are identified, with each color in the set of colors corresponding to one of the potential states. At 404, a fixed ordering for the set of colors is established. At 406, a timeline graph is displayed that includes a plurality of colored vertical bars 302, wherein each colored vertical bar corresponds to a time interval of the process and includes at least one color selected from the set of colors based on at least one state occurring during the time interval corresponding to the vertical bar, and wherein the plurality of colored vertical bars includes a set of multiple-color vertical bars that each include a plurality of colors appearing in a vertical order based on the fixed ordering. In one embodiment, the plurality of colors appearing in each multiple-color vertical bar are selected from the set of colors based on a plurality of states occurring during the time interval corresponding to the multiple-color vertical bar. In one embodiment, the identifying potential states and corresponding colors (402), establishing a fixed ordering (404), and displaying a timeline graph (406) are performed by at least one processor.

The total number of colors appearing in each multiple-color vertical bar is limited in one embodiment to a predetermined number of colors (e.g., two) that is less than the total number of colors in the set of colors. In one embodiment of method 400, a first one of the multiple-color vertical bars represents a first time interval with more than two states occurring during the first time interval. In one form of this embodiment, two most prominent states are identified from the more than two states occurring during the first time interval, and two colors are selected for the first multiple-color vertical bar from the set of colors based on the identified two most prominent states. In one embodiment, the two most prominent states are identified based on time durations of the more than two states occurring during the first time interval, and the two most prominent states have longer time durations than any other states occurring during the first time interval.

FIG. 5 is a flow diagram illustrating a method 500 of providing a visualization of states of a process according to another embodiment. At 502 in method 500, a set of potential states 308 that can occur during the process and a corresponding set of colors are identified, with each color in the set of colors corresponding to one of the potential states. At 504, a fixed ordering for the set of colors is established. At 506, a timeline graph is displayed that includes a plurality of colored vertical bars 302, wherein each colored vertical bar corresponds to a time interval of the process and includes at least one color selected from the set of colors based on at least one state occurring during the time interval corresponding to the vertical bar, and wherein the plurality of colored vertical bars includes a set of two-color vertical bars that each include two colors appearing in a vertical order based on the fixed ordering with the two colors in each two-color vertical bar representing two most prominent states occurring during the time interval corresponding to the two-color vertical bar. In one embodiment, the identifying potential states and corresponding colors (502), establishing a fixed ordering (504), and displaying a timeline graph (506) steps are performed by at least one processor.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of providing a visualization of states of a process, comprising:
    identifying a set of potential states that can occur during the process and a corresponding set of colors, each color in the set of colors corresponding to one of the potential states;
    establishing a fixed ordering for the set of colors;
    displaying a timeline graph including a plurality of colored vertical bars, wherein each colored vertical bar corresponds to a time interval of the process and includes at least one color selected from the set of colors based on at least one state occurring during the time interval corresponding to the vertical bar, wherein the plurality of colored vertical bars includes a set of multiple-color vertical bars that each include a plurality of colors appearing in a vertical order based on the fixed ordering, and wherein the at least one state occurring during each time interval varies over the time intervals and the at least one color included in each of the colored vertical bars correspondingly varies over the time intervals in the graph, and wherein the colors in each multi-color vertical bar represent only most prominent states occurring during the time interval corresponding to the multi-color vertical bar, and wherein the most prominent states for a first one of the time intervals are automatically selected from at least four states occurring during the first time interval based on time durations of the at least four states occurring during the first time interval,
    wherein the most prominent states for the first time interval include only two most prominent states, and wherein the two most prominent states have longer time durations than any other states occurring during the first time interval; and
    wherein the identifying, establishing, and displaying are performed by at least one processor.

2. The method of claim 1, wherein the plurality of colors appearing in each multiple-color vertical bar are selected from the set of colors based on a plurality of states occurring during the time interval corresponding to the multiple-color vertical bar.

3. The method of claim 1, and further comprising:
limiting a total number of colors appearing in each multiple-color vertical bar to a predetermined number of colors that is less than a total number of colors in the set of colors.

4. The method of claim 3, wherein the predetermined number of colors is two.

5. The method of claim 1, and further comprising:
identifying a time duration of each state occurring during each time interval of the process; and
wherein a vertical height for each color appearing in the multiple-color vertical bars is determined based on the identified time durations.

6. The method of claim 1, wherein the colored vertical bars each have an equal height and width.

7. The method of claim 6, wherein the colored vertical bars are each one pixel wide vertical lines.

8. The method of claim 7, wherein the colored vertical lines are positioned directly adjacent to each other with no gap therebetween.

9. The method of claim 1, wherein the set of potential states represents potential states of a thread in a multi-threaded system.

10. A computer-readable storage medium storing computer-executable instructions that when executed by at least one processor cause the at least one processor to perform a method of providing a visualization of states of a process, the method comprising:
identifying a set of potential states that can occur during the process and a corresponding set of colors, each color in the set of colors corresponding to one of the potential states;
establishing a static ordering for the set of colors; and
displaying a plurality of colored vertical bars in a timeline graph, wherein each colored vertical bar corresponds to a time interval of the process and includes at least one color selected from the set of colors based on at least one state occurring during the time interval corresponding to the vertical bar, wherein the plurality of colored vertical bars includes a set of multiple-color vertical bars that each include a plurality of colors appearing in a vertical order based on the fixed ordering, and wherein the at least one state occurring during each time interval varies over the time intervals and the at least one color included in each of the colored vertical bars correspondingly varies over the time intervals in the graph, and wherein the colors in each multi-color vertical bar represents at least two most prominent states occurring during the time interval corresponding to the multi-color vertical bar, and wherein the at least two most prominent states for a first one of the time intervals is automatically selected from at least four states occurring during the first time interval based on time durations of the at least four states occurring during the first time interval.

11. The computer-readable storage medium of claim 10, wherein the method further comprises:
limiting a total number of colors appearing in each multiple-color vertical bar to a predetermined number of colors that is less than a total number of colors in the set of colors.

12. The computer-readable storage medium of claim 11, wherein the predetermined number of colors is two.

13. The computer-readable storage medium of claim 12, wherein a first one of the multiple-color vertical bars represents a first time interval with more than two states occurring during the first time interval, and wherein the method further comprises:
identifying two most prominent states from the more than two states occurring during the first time interval; and
selecting two colors for the first multiple-color vertical bar from the set of colors based on the identified two most prominent states.

14. The computer-readable storage medium of claim 13, wherein the two most prominent states are identified based on time durations of the more than two states occurring during the first time interval.

15. The computer-readable storage medium of claim 10, wherein the method further comprises:
identifying a time duration of each state occurring during each time interval of the process; and
wherein a vertical height for each color appearing in the multiple-color vertical bars is determined based on the identified time durations.

16. A method of providing a visualization of states of a process, comprising:
identifying a set of potential states that can occur during the process and a corresponding set of colors, each color in the set of colors corresponding to one of the potential states;
establishing a fixed ordering for the set of colors;
displaying a timeline graph including a plurality of colored vertical bars, wherein each colored vertical bar corresponds to a time interval of the process and includes at least one color selected from the set of colors based on at least one state occurring during the time interval corresponding to the vertical bar, wherein the plurality of colored vertical bars includes a set of two-color vertical bars that each include only two colors appearing in a vertical order based on the fixed ordering with the two colors in each two-color vertical bar representing only two most prominent states occurring during the time interval corresponding to the two-color vertical bar, and wherein the two most prominent states for a first one of the time intervals is automatically selected from at least four states occurring during the first time interval based on time durations of the at least four states occurring during the first time interval, and wherein the two most prominent states have longer time durations than any other states occurring during the first time interval; and
wherein the identifying, establishing, and displaying are performed by at least one processor.

17. The method of claim 16, and further comprising:
identifying a time duration of each state occurring during each time interval of the process; and
wherein a vertical height for each color appearing in the two-color vertical bars is determined based on the identified time durations.

* * * * *